United States Patent
Wallace

(10) Patent No.: US 7,428,863 B2
(45) Date of Patent: Sep. 30, 2008

(54) APPARATUS FOR PEELING POTATOES AND THE LIKE

(75) Inventor: Joseph E. Wallace, Creston, IA (US)

(73) Assignee: Vanmark Corporation, Creston, IA (US)

( * ) Notice: Subject to any disclaimer, the term of this patent is extended or adjusted under 35 U.S.C. 154(b) by 442 days.

(21) Appl. No.: 10/867,801

(22) Filed: Jun. 15, 2004

(65) Prior Publication Data
US 2005/0274266 A1  Dec. 15, 2005

(51) Int. Cl.
*A23N 7/02* (2006.01)

(52) U.S. Cl. .............................. 99/625; 99/628; 99/630; 426/483

(58) Field of Classification Search .................. 99/625, 99/628, 629, 623, 626; 15/3.11, 3.13, 3.14, 15/3.19, 3.2, 2.21; 134/65, 132, 133, 134; 51/295; 426/483, 482
See application file for complete search history.

(56) References Cited

U.S. PATENT DOCUMENTS

| | | | | |
|---|---|---|---|---|
| 3,745,914 | A | * | 7/1973 | Wallace ........................ 99/630 |
| 5,858,429 | A | | 1/1999 | Wallace |
| 5,891,204 | A | * | 4/1999 | Neff ............................ 51/297 |
| D442,035 | S | | 5/2001 | Wallace |
| 6,575,085 | B2 | | 6/2003 | Thomas et al. |
| 6,776,868 | B2 | * | 8/2004 | Follensbee .................. 156/279 |
| 2003/0121212 | A1 | * | 7/2003 | Minick et al. ................. 51/295 |
| 2004/0109978 | A1 | * | 6/2004 | Michel ........................ 428/99 |

* cited by examiner

*Primary Examiner*—Reginald L Alexander

(57) ABSTRACT

An improved peeling machine for controlling the removal of a peeling from a food product, the peeling machine having a hopper with a supply auger that pushes a food item to a peeling chamber, the peeling chamber having a plurality of parallel longitudinal rollers arranged in an arcuate juxtaposition relation, as the food item moves through the plurality of rollers, the food item is peeled and moved toward the discharge gate of the peeling machine, the improvement is the use of an abrasive material on the rollers that is formed using electrostatic charges to align the abrasive particles onto an epoxy layer and adhering this epoxy layer onto the exterior surface of the roller.

6 Claims, 5 Drawing Sheets

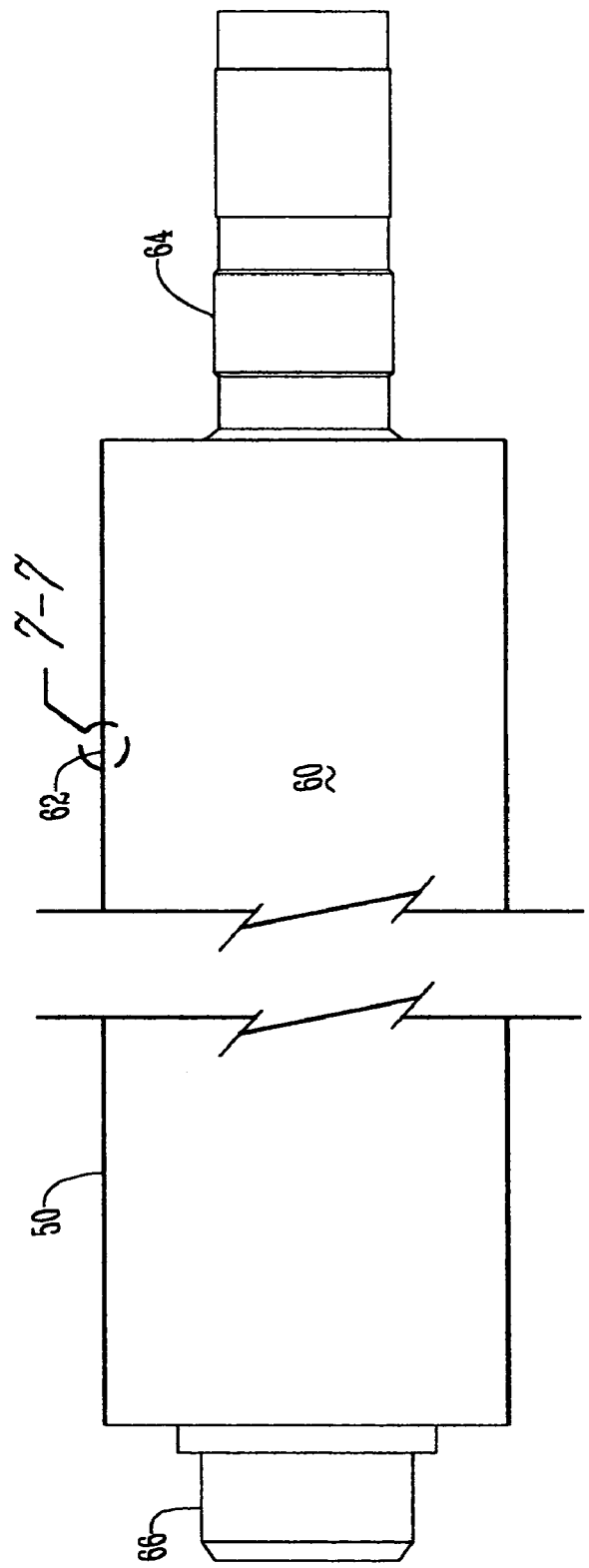
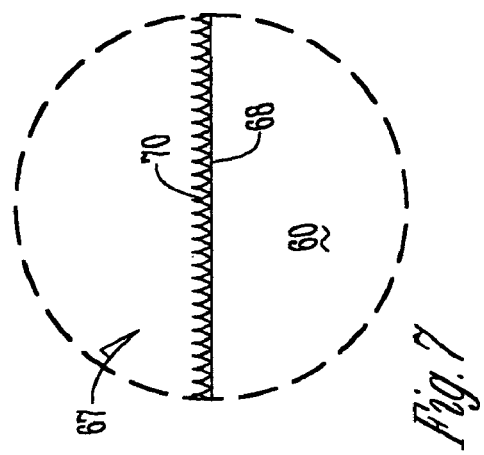

APPARATUS FOR PEELING POTATOES AND THE LIKE

BACKGROUND OF THE INVENTION

This invention relates to the field of peeling food items and specifically the peeling of potatoes and nuts, such as pistachio nuts. During the peeling process a vegetable or nut, such as a potato is placed into an auger. Once in the auger the potato is moved forward by an auger that pushes the potato into the inlet end of a peeling chamber. Within that chamber are a series of rollers that are used to skin the potato and as the potato is skinned, it is moved forward through the chamber and deposited to the outlet end of the chamber at a discharge gate.

Known in the art are several different types of rollers used in the peeling chamber for peeling the potato. Some rollers use metal brushes that are attached to the roller and scrape the peelings off the potato. Yet another way to peel the skin off the potato using rollers is to place aligned knurls into the metal shaft of the rollers as seen in U.S. Pat. No. 6,575,085 to Thomas. Yet another way to skin the potato is to take conventional sand paper that is produced by taking an epoxy layer and placing grit material or abrasive particles randomly onto the epoxy layer to form an abrasive surface.

Though these methods can be used to successfully peel a potato problems with these methods still remain. In particular, current wire brush and sand paper rollers tend to wear out easily and must be changed in order to be effective within three or four months of use. Additionally, placing knurls into the metal shafts of the rollers can be difficult and damaging to the shaft. Also, current rollers must be cleared often creating increased maintenance costs. Consequently, there is a need in the art for an improved roller material that can be placed on the rollers to provide greater longevity before replacement as compared to the prior art.

Therefore, it is a primary object of the present invention to provide an improved peeler roller that improves longevity of the roller as compared to the prior art.

Yet another object of the present invention is to provide for an improved peeler roller that allows for improved peeling of a food product.

Another object of the present invention is to provide a food peeling device that requires little maintenance.

These and other objects, features, or advantages of the present invention will become apparent from the specification and claims.

BRIEF SUMMARY OF THE INVENTION

The present invention is an improved food peeling device. The food peeling device has a hopper with an auger that moves food through the hopper to the inlet end of a peeler chamber. Within the peeler chamber are a plurality of parallel longitudinal rollers arranged in an arcuate juxtaposition relation that receives the food item and pushes the food item to the end of the chamber. At the end of the chamber the food item exits through a discharge gate at the chambers outlet end. The device uses an abrasive material on its rollers to peel the food items that is created by magnetizing the particles to be placed on the epoxy, thus causing the particles to align.

BRIEF DESCRIPTION OF THE DRAWINGS

FIG. 6 is a plan view of a roller in the present invention;

FIG. 7 is an exploded view of the circle taken along line 7-7 of FIG. 6 showing the material of the roller of the present invention.

DESCRIPTION OF THE PREFERRED EMBODIMENTS OF THE INVENTION

Figure 5:
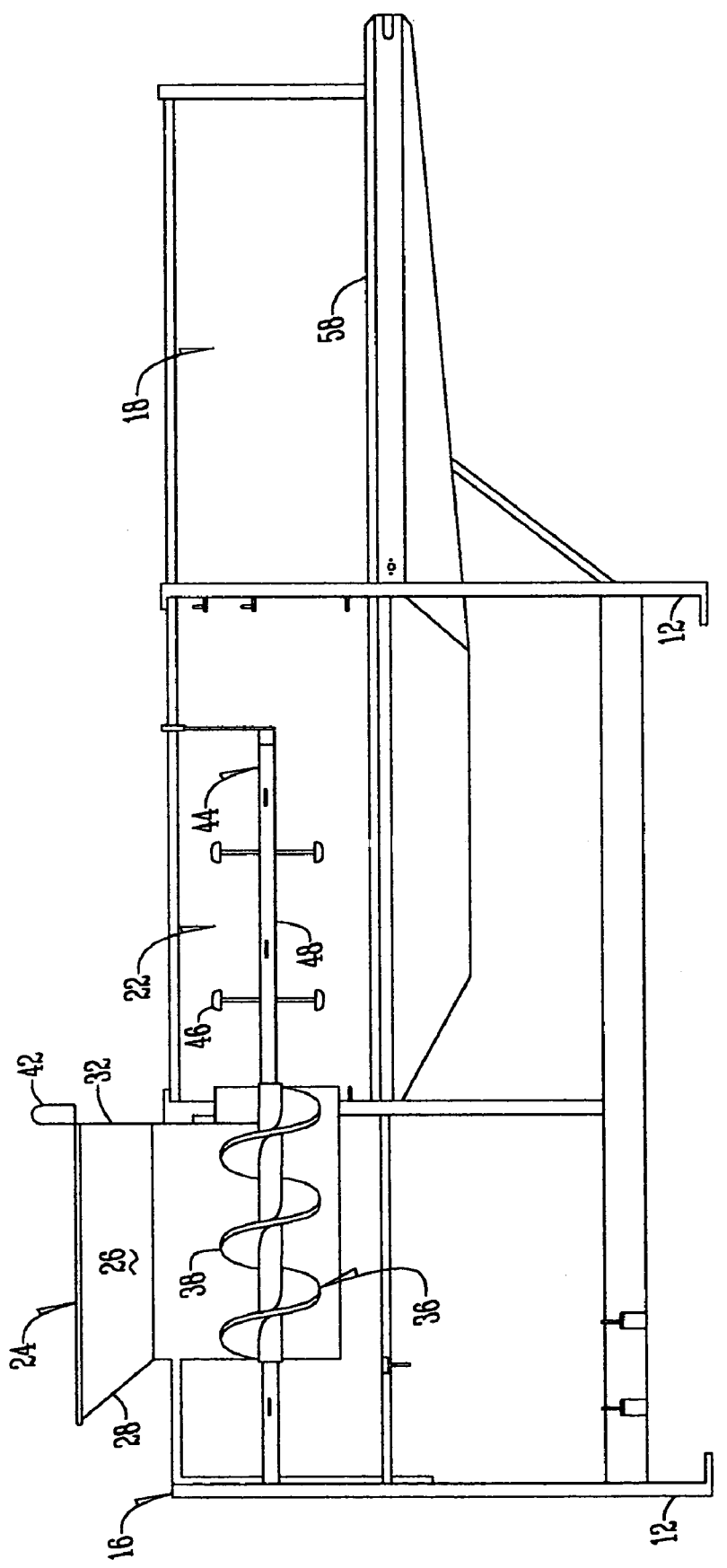
FIG. 5 is a longitudinal sectional taken along the lines 5-5 in FIG. 1.

The peeling machine, device or means of the present invention is generally denoted by the reference numeral 10 in the drawings and this description. Referring to FIGS. 1-3 and 6, the peeling machine 10 has a plurality of supporting elements or legs 12 supporting an elongated body 14. The body 14 includes an infeed section 16, an output section 18 and a peeling section 20 between the infeed and output sections 16, 18. The peeling section 20 comprises a peeling compartment or chamber 22 substantially enclosed by a plurality of walls (FIG. 5).

The infeed section has a hopper 24 with a top opening for depositing the product to be peeled. The hopper walls 26, 28, 30, 32 are slanted inwardly and their lower edges define a bottom opening or mouth 34 disposed above an infeed auger 36. The infeed auger 36, hereinafter referred to as auger, has one or more helical auger flight(s) 38 which provide a continuous and consistent product infeed rate to the peeling chamber. The auger 36 and hopper 24 eliminate pinch points and product damage by wrapping the hopper wall 32 around the auger 36 to the ten o'clock position looking in the direction of product flow. This ten o'clock position allows product to seek a path either one side or the other of the auger flight 38. The product is not drawn into a pinch point, which would happen if the hopper wall 32 was tangentially vertical to the outer circumference of the auger. The auger rotation is counter-clockwise and creates a down movement at the point of tangency. A lip 40 is formed at an obtuse angle at the bottom portion of wall 30. Thus, the bottom opening 34 of the hopper 24 is non-parallel to the edge of the flight 38. The combination of the hopper surfaces 28-32, 40, hopper opening 34 and auger flight(s) 38, allow product to be run with no damage. The rotational speed of the auger 36 and its cubic displacement govern the product feed rate to the peeling chamber 22.

A limit switch 42 controls two levels within this hopper 24: 1) the top of the flights, and 2) the top of the hopper 24. Loading product to the first level (to the top of the flights) ensures the auger 36 is completely filled therefore the displacement of this auger 36 will feed product into the peeling chamber 22 at an exact, continuous, and consistent rate. When the auger 36 is running the limit switch 42 will stop the peeler 10 if the product level falls below the top of the flights 38. This ensures a consistent product infeed rate to the peeling chamber 22. Secondly, this limit switch 42 also controls the upper level of the hopper 24 (capacity) and signals incoming product transporting devices to shut off when this limit is reached. The speed control of this hopper 24 is meant to be at the disposal of the operator who must adjust the throughput rate of the peeler 10 to match other equipment to provide a continuous flow through the entire line.

Moving into the peeling chamber 22 and referring to FIG. 5, a product tumbler 44, hereinafter referred to as tumbler, is rotatably mounted therein and driven in conventional manner. The tumbler 44 has flexible paddles 46 mounted on a generally horizontal shaft 48 in the center of the peeling chamber 22. The tumbler 44 extends substantially parallel to the longitudinal axis of the elongated peeling rolls 50 (FIG. 6). This assures that regardless of the friction between peeling surface and product that the product will tumble by the action of this tumbler. The tumbler 44 rotates in the same direction as the product would naturally move in the peeling chamber 22.

The peeling rolls 50 comprise a series of shafts upon which are installed rolls. Rolls 50 touch the product and peel, wash or otherwise have contact with or act upon the product. The rotational speed of the rolls 50 is adjustable and clockwise in the direction of the product flow. On exceptions, multiple or individual rolls 50 may rotate in an opposite direction to adjacent rolls 50 to intentionally create a pulling motion to eliminate debris from the peeling chamber 22, i.e. for cleaning purposes. As product moves longitudinally along these rolls 50 a continuous effect between peeling rolls and product provides the required end result of peeled or washed product.

Adjustment to the speed of the peeling roll 50 is one means of creating a desired effect; a second means is adjusting the load or amount of product within the peeling chamber 22. The time product takes to travel the length of the rolls 50 is the time allowed to peel or wash to accomplish the desired end result, however this time is a factor of the total line capacity and therefore retention time is not a part of this invention theory. With this in mind, adjustments such as roll speed and load level within the peeling chamber are the controls used to create the desired peeling or washing effect.

As the peeling rolls 50 rotate they create tumbling action within the machine 10. This natural tumbling of the product, or when assisted by a tumbler 44, creates action of the product within the peeling chamber 22. This action allows all of the outer surface of the product to come in contact with the peeling or washing surface of the rolls 50. This area of contact is measured by the diameter times the length of the peeling roll 50 and gives square feet of surface area for the product to contact. Increasing the rotational speed of the rolls 50 increases the available area for the product to contact the peeling or washing surface. Inversely with the decrease of the rotational speed of the rolls 50 the surface area is decreased. This is known as the amount of peeling or washing area.

Figure 1:
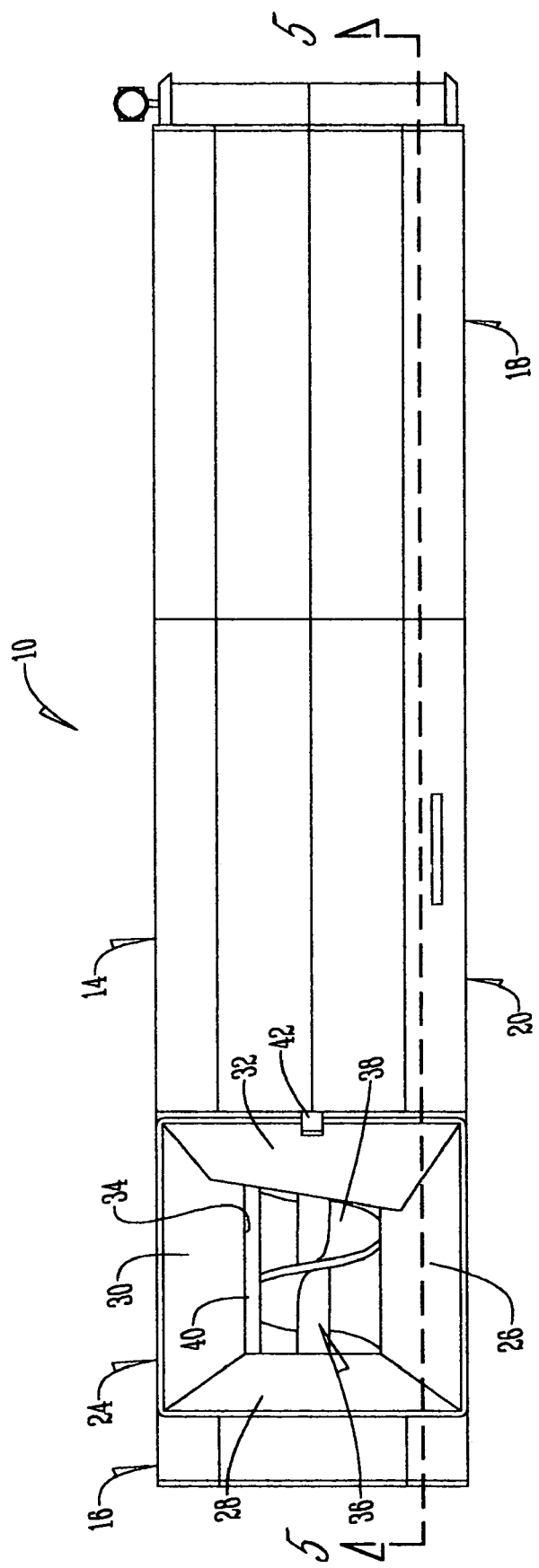
FIG. 1 is a top plan view of a peeling machine equipped with the present invention.
Figure 3:
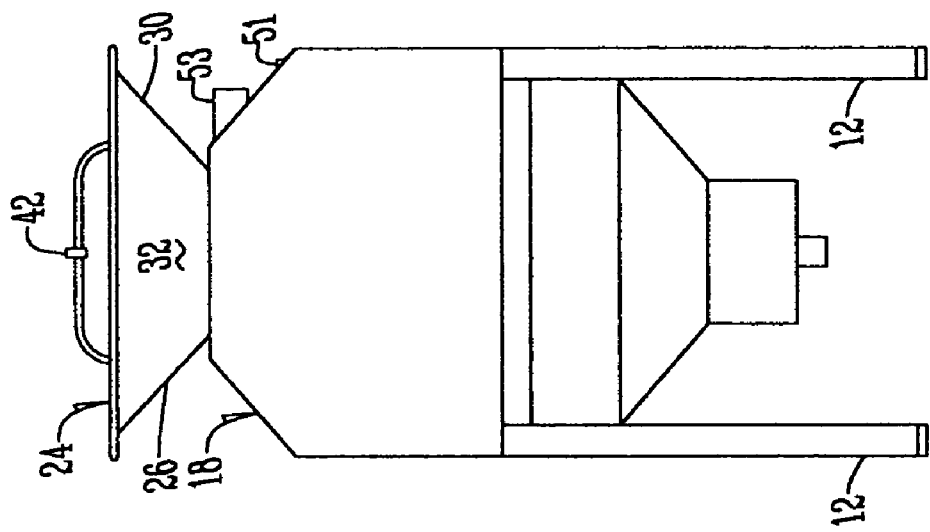
FIG. 3 is an end elevation view of the end opposite the discharge gate.
Figure 2:
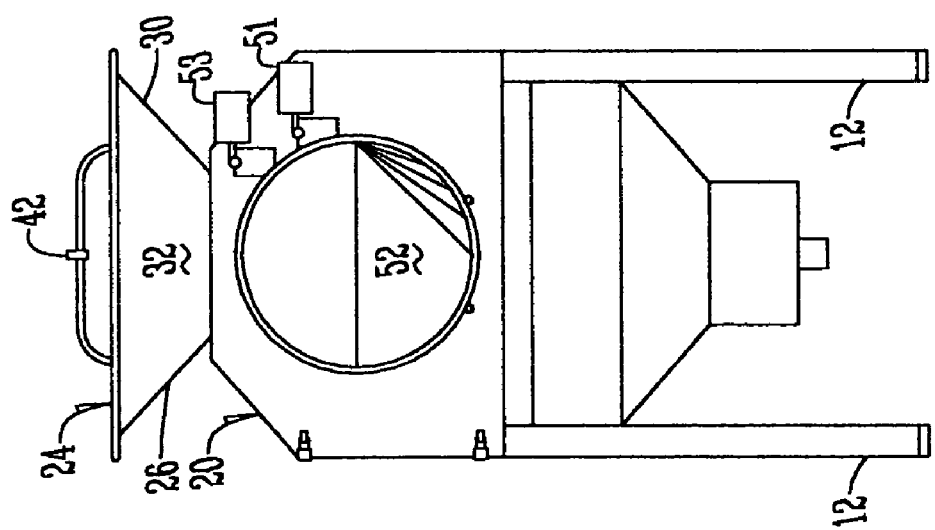
FIG. 2 is an end elevation view showing the discharge gate.
Figure 4:
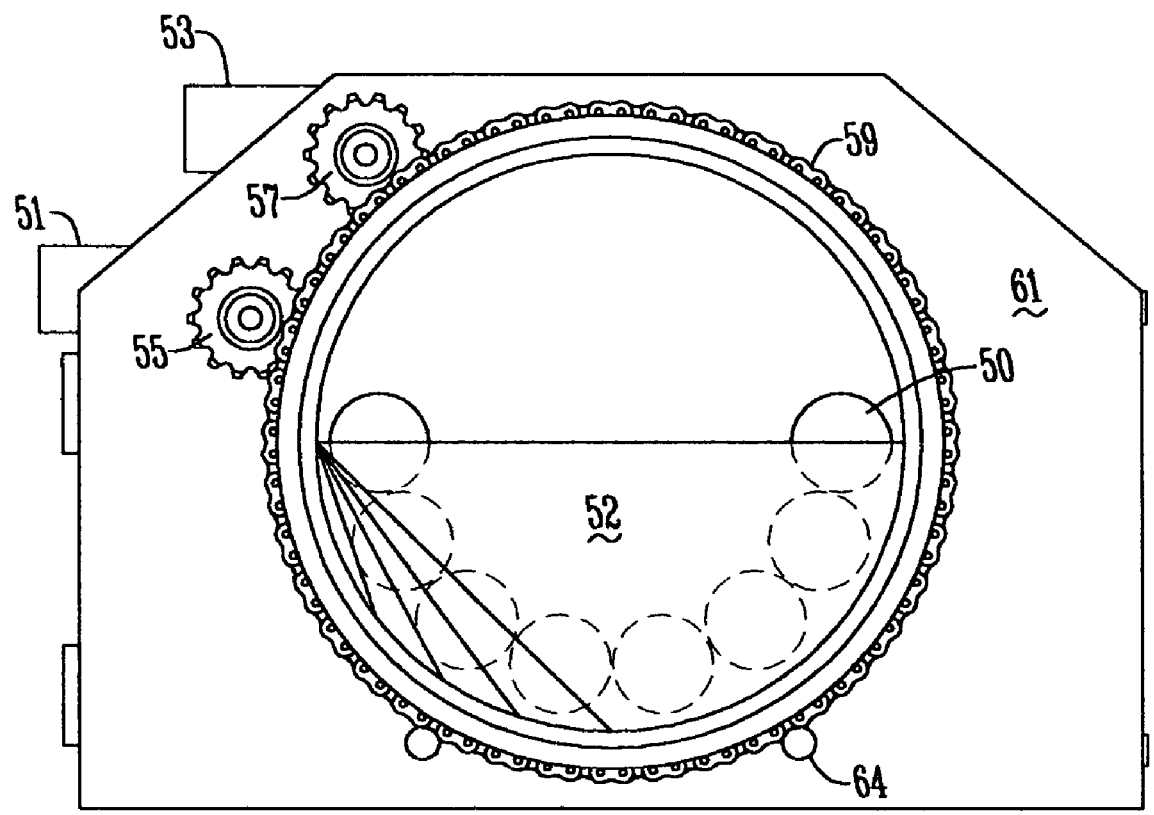
FIG. 4 is a sectional view showing the reverse or inner side of the discharge gate of FIG. 2.

Moving to the output section 18 of the peeler 10 and referring to FIG. 2, the discharge gate 52, hereinafter referred to as gate, is an adjustable load level control device. It creates an adjustable restriction of the product level within the peeling chamber 22; i.e., the higher the dam and deeper the water. As best seen in FIG. 4, a pair of motors 51, 53 respectively drive sprockets 55, 57 which engage a chain 59 fixed to the periphery of the discharge gate 52. The gate 52 is journaled in a surrounding frame 61 and guided by guide rollers 64 so as to rotate and thereby be adjustable between open and closed positions when driven by the sprockets 55, 57.

Product load within the peeling chamber 22 is varied by the position of the discharge gate 52. As the gate 52 is closed it creates a deeper load of product in the peeling chamber 22 creating more pressure between the product and the peeling surface by building product on top of product. As the gate 52 is opened it allows product to flow from the machine creating a lesser depth of load in the peeling chamber 22 thus creating less pressure between product and peeling surface. This is known as the effect of the peeling or washing surface.

Therefore, with a consistent and continuous infeed rate and a given capacity of product throughput, the two adjustments needed for the desired end product result are effect and amount of the peeling or washing surface. The gate position determines the effect and rotational speed of the rolls 50 determines the amount. These two adjustments will interact with each other at any volume of throughput within the machine's range of volume and speed. The primary control is the position of the gate 52 (effect); the secondary control is the roll speed (amount). With consistent and continuous input capacities dictated by the control of the auger 36, and balanced controls between gate position and roll speed, end product results can be predicted.

As seen in FIG. 6, the rolls 50 have an elongated cylindrical body 60 that has an exterior surface 62. On either end of the roll is a first mounting shaft 64 and second mounting shaft 66 that rotatably connect the roll 50 to the peeler 10 within the chamber 22.

The exterior surface 62 of the present invention has an abrasive material 67 adhered to it, fitting on the cylindrical body. The abrasive material 67 can be securely mounted onto the exterior surface 62 or can be detachably connected to the surface 62. Traditionally, in prior art, the abrasive material 67 is manufactured by laying down a surface of epoxy 68 and sprinkling abrasive particles 70 onto the epoxy 68 causing the abrasive particles 70 to randomly fall onto the epoxy level 68. In the present invention, the abrasive material, as seen in FIG. 7, is manufactured by magnetizing the abrasive particles 70 using electrostatic charges thus polarizing the particles such that they are in alignment on the level of epoxy 68.

By aligning the abrasive particles 70, several advantages over the prior art rollers are present. The aligned abrasive particles 70 provide for a more efficient peel, thus ensuring that the entire food item is peeled before exiting the peeler. Additionally, whereas previous abrasive materials such as the randomly aligned particles on epoxy and wire brushes traditionally would last only three to four months before the roller would need to be replaced, the abrasive material as seen in FIG. 7 can last over 18 months without needing to be replaced. Additionally, the aligned abrasive particles require less cleaning and maintenance. Thus, by using an abrasive material that is aligned by magnetization, roll 50 of the present invention improves upon the state of the art. Consequently, the invention as disclosed achieves all of its objectives.

It will be appreciated by those skilled in the art that other various modifications could be made to the device without the parting from the spirit in scope of this invention. All such modifications and changes fall within the scope of the claims and are intended to be covered thereby.

What is claimed is:

1. A product peeling machine for controlling the removal of peeling from a food product comprising:
   a hopper having a supply auger for discharge of the product;
   a peeling chamber having a plurality of parallel longitudinal rollers arranged in an arcuate juxtaposition relation positioned to receive discharge from the hopper at an inlet and having at least one roller with an abrasive material adhered to the roller;
   said abrasive material having abrasive particles aligned by the magnetization of the particles;
   a discharge gate rotatably mounted to the peeling chamber defining an outlet; and
   wherein the abrasive particles aligned by magnetization remove a peeling from a food product.

2. The peeling machine of claim 1 wherein potatoes are the food product being peeled.

3. The peeling machine of claim 1 wherein nuts are the food product being peeled.

4. The roller of claim 1 wherein the abrasive material is detachably adhered to the roller.

5. The roller of claim 1 wherein the abrasive particles are aligned on an epoxy.

6. A method of peeling a food product steps comprising:
providing a hopper having a supply auger for discharge of the product;
providing a peeling chamber having a plurality of parallel longitudinal rollers arranged in an arcuate juxtaposition relation positioned to receive discharge from the hopper at an inlet and having at least one roller with an abrasive material adhered to the roller;
said abrasive material having abrasive particles aligned by the magnetization of the particles;
providing a discharge gate rotatably mounted to the peeling chamber defining an outlet; and
removing a peeling from the food product with the abrasive particles aligned by magnetization.

\* \* \* \* \*